United States Patent
Xu et al.

(10) Patent No.: US 12,131,430 B2
(45) Date of Patent: Oct. 29, 2024

(54) AUGMENTED SCENE FOR AUTONOMOUS VEHICLE TESTING

(71) Applicant: TSINGHUA UNIVERSITY, Beijing (CN)

(72) Inventors: Shaobing Xu, Beijing (CN); Shangyi Li, Beijing (CN); Shuocheng Yang, Beijing (CN); Jianqiang Wang, Beijing (CN); Shengbo Li, Beijing (CN); Bo Cheng, Beijing (CN); Keqiang Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 164 days.

(21) Appl. No.: 18/169,165

(22) Filed: Feb. 14, 2023

(65) Prior Publication Data
US 2024/0185538 A1    Jun. 6, 2024

(30) Foreign Application Priority Data
Dec. 2, 2022    (CN) .......................... 202211545016.1

(51) Int. Cl.
| | |
|---|---|
| *G06T 19/00* | (2011.01) |
| *B60W 40/02* | (2006.01) |
| *B60W 60/00* | (2020.01) |
| *G01M 17/007* | (2006.01) |
| *G06T 19/20* | (2011.01) |
| *G06V 20/56* | (2022.01) |

(52) U.S. Cl.
CPC .......... *G06T 19/006* (2013.01); *B60W 40/02* (2013.01); *B60W 60/00* (2020.02); *G01M 17/007* (2013.01); *G06T 19/20* (2013.01); *G06V 20/56* (2022.01); *B60W 2556/45* (2020.02)

(58) Field of Classification Search
None
See application file for complete search history.

(56) References Cited

PUBLICATIONS

Lee et al., "Enhancing the Performance of Vehicle Passenger Detection under Adverse Weather Conditions Using Augmented Reality-Based Machine Learning Approach", 2021. (Year: 2021).*
Gonda et al., "Integrating Virtual and Augmented Reality Based Testing into the Development of Autonomous Vehicles", 2018. (Year: 2018).*

* cited by examiner

*Primary Examiner* — Nicholas R Wilson (57) ABSTRACT

The embodiments provide a method of augmenting environmental scenes and an autonomous vehicle testing system. The method includes: obtaining, from an autonomous vehicle, image data representing an image, which depicts an environment where the autonomous vehicle drives; generating virtual object graphics representing virtual object(s) that, when rendered over the image, result in an object-augmented image; generating global scene graphics based on the object-augmented image that, when rendered along with the object-augmented image, result in a visual representation as the environment would appear when experiencing predetermined weather conditions; generating detailed weather effect graphics representing detailed weather effect (s); generating a composite weather-object-augmented image based on the virtual object graphics, the global scene graphics, and the detailed weather effect graphics; and causing the composite weather-object-augmented image to be inputted into an onboard vehicle controller of the autonomous vehicle.

20 Claims, 6 Drawing Sheets

AUGMENTED SCENE FOR AUTONOMOUS VEHICLE TESTING

CROSS-REFERENCE TO RELATED APPLICATIONS

This application claims priority to Chinese Patent Application No. CN202211545016.1 filed on Dec. 2, 2022, the entire disclosure of which is incorporated herein by reference.

TECHNICAL FIELD

This invention relates to methods and systems for rendering scenes to be used by an autonomous vehicle during testing.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The system and method described herein enables an image captured by an autonomous vehicle (AV) to be augmented with weather-related and traffic-related graphics so that the augmented image appears as a photorealistic visual representation of the environment as the environment would appear when experiencing predetermined or selected weather and/or other environmental conditions. Further, the system and method described herein enables the augmented image to be inputted into an onboard vehicle controller of the AV so that the AV carries out at least one autonomous operation based on the augmented image. This allows the AV to be tested under a variety of diverse weather conditions, such as rain or snow. In an embodiment, virtual object graphics representing one or more virtual objects, such as virtual vehicles or pedestrians (or other traffic-related objects), are also generated and then combined with the weather-related graphics to form a composite augmented image that appears as a photorealistic visual representation of the environment as it would appear when experiencing the predetermined weather conditions and as if the virtual objects were real objects present within the environment. This allows testing of the AV according to various combinations of traffic scenarios/conditions and weather conditions.

According to some embodiments, the weather-related graphics may be generated in two steps. First, global scene graphics are generated, and the global scene graphics, when rendered along with the object-augmented image, result in a visual representation of the environment as the environment would appear when experiencing predetermined weather conditions. Second, detailed weather effect graphics representing at least one detailed weather effect are generated. As an example where the predetermined weather conditions are snowy conditions, the global scene graphics, when rendered along with the virtual object graphics or other image/graphics, results in a visual representation of the environment being covered in snow (e.g., snow covering a road, snow covering virtual vehicles or other virtual objects, snow covering real vehicles or other real objects). In this same example where the predetermined weather conditions are snowy conditions, the detailed weather effect graphics, when rendered along with the image, results in snowflakes being presented to the camera. For example, when the camera's field of view passes through a windshield, snowflakes may be rendered so that they appear as if they are present outside the windshield and flying in the sky. In an example where the predetermined weather conditions are rainy conditions, the detailed weather effect graphics may represent raindrops present on the windshield and/or running down the windshield. In one embodiment, the global scene graphics are generated using one or more artificial intelligence (AI) techniques and the detailed weather effect graphics are generated using one or more physics-based techniques.

Figure 1:
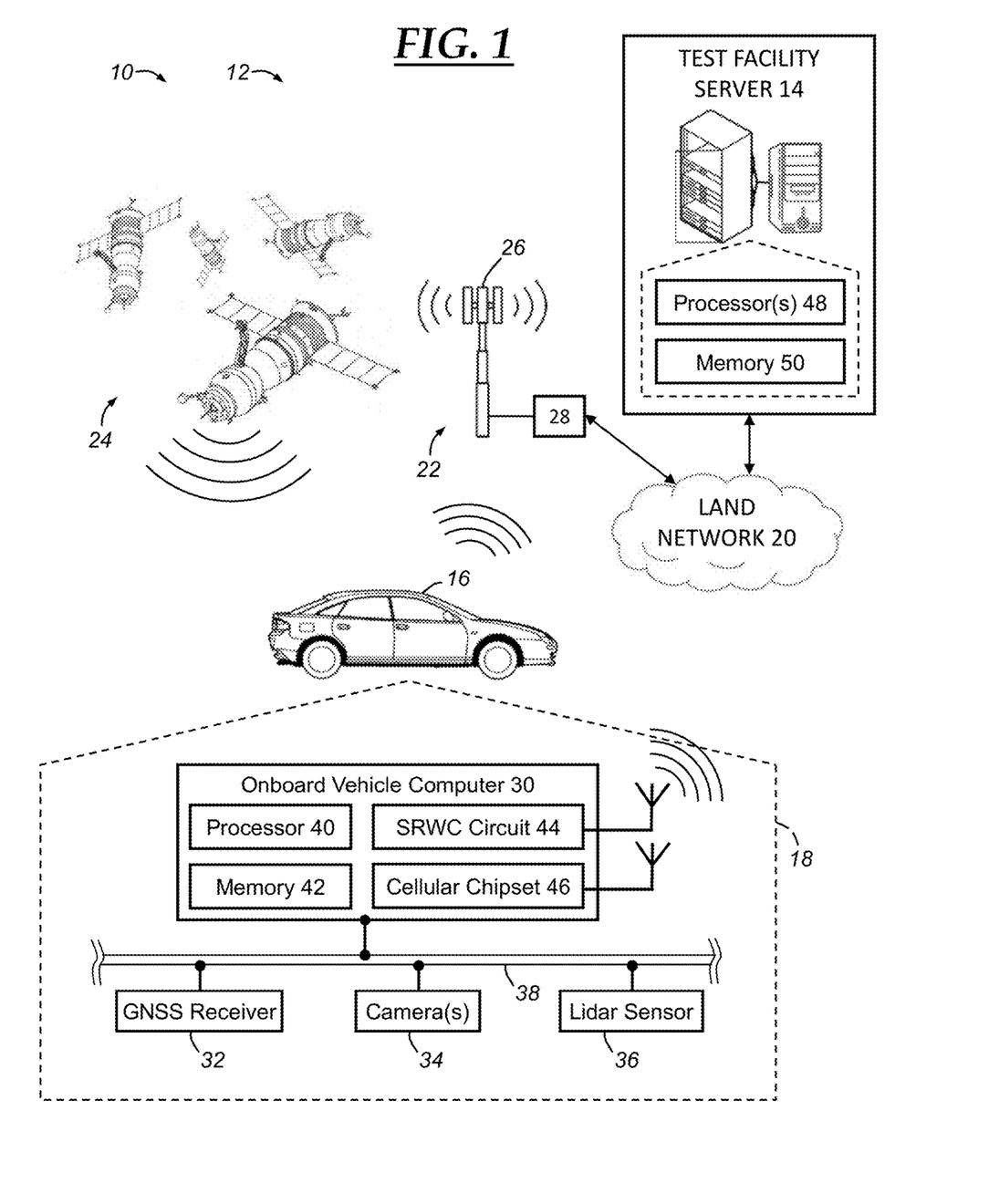
FIG. 1 depicts a communications system that includes an autonomous vehicle (AV) and a test facility server, and that may be used to carry out one or more methods described herein, according to a first embodiment.

With reference now to FIG. 1, there is shown an operating environment that comprises a communications system 10 (that is used at a test facility 12), a test facility server 14, an autonomous vehicle (AV) 16 having vehicle electronics 18, a land network 20, a wireless carrier system 22, and a constellation of global navigation satellite system (GNSS) satellites 24. The test facility 12 is an example of a vehicle test environment at which one or more of the methods described herein may be carried out or used. In some embodiments, the vehicle test environment may be located at a private test facility and, in other embodiments, the vehicle test environment may comprise one or more public roads or areas, such as a parking lot. It should be appreciated that while the illustrated embodiment of FIG. 1 provides an example of one such communications system 10, the system and method described below may be used as part of various other communications systems.

The land network 20 may be a conventional land-based telecommunications network that is connected to one or more landline telephones and connects the wireless carrier system 22 to the test facility server 14. For example, the land network 20 may include a public switched telephone network (PSTN) such as that used to provide hardwired telephony, packet-switched data communications, and the Internet infrastructure. One or more segments of the land network 20 may be implemented through the use of a standard wired network, a fiber or other optical network, a cable network, power lines, other wireless networks such as wireless local area networks (WLANs), or networks providing broadband wireless access (BWA), or any combination thereof.

The wireless carrier system 22 may be any suitable long-range data transmission system, such as a cellular telephone system. The wireless carrier system 22 is shown as including a single cellular tower 26; however, the wireless carrier system 22 may include additional cellular towers as well as one or more of the following components, which may depend on the cellular technology being used: base transceiver stations, mobile switching centers, base station controllers, evolved nodes (e.g., eNodeBs), mobility management entities (MMEs), serving and PGN gateways, etc., as well as any other networking components used to connect the wireless carrier system 22 with the land network 20 or to connect the wireless carrier system 22 with user equipment (UEs, e.g., which may include telematics equipment in the AV 16), all of which is indicated generally at 28. The wireless carrier system 22 may implement any suitable communications technology, including for example GSM/GPRS technology, CDMA or CDMA2000 technology, LTE technology, 5G, etc. In at least one embodiment, the wireless carrier system 22 implements 5G cellular communication technology and includes suitable hardware and configuration. In some such embodiments, the wireless carrier system 22 provides a 5G network usable by the AV 16 for communicating with the test facility server 14 or other computer/device remotely located from the AV 16. In general, the wireless carrier system 22, its components, the arrangement of its components, the interaction between the components, etc. is generally known in the art.

The test facility server 14 may be used to provide a backend for one or more components of the test facility 12. In at least one embodiment, the test facility server 14 includes one or more computers or computing devices (collectively, "computers") that are configured to carry out one or more steps of the methods described herein. In another embodiment, the test facility server 14 is used to store information concerning one or more components of the test facility 14 and/or information pertaining to the AV 16, such as vehicle state information that may be used to evaluate performance of the AV 16 during testing. The test facility server 14 is a server that is carried out or hosted by one or more computers, each of which includes a processor and a non-transitory, computer-readable memory that is accessible by the processor.

The AV 16 is depicted in the illustrated embodiment as a passenger car, but it should be appreciated that any other vehicle including motorcycles, trucks, sports utility vehicles (SUVs), recreational vehicles (RVs), bicycles, other vehicles or mobility devices that can be used on a roadway or sidewalk, etc., can also be used. As depicted in the illustrated embodiment, the AV 16 includes the vehicle electronics 18, which include an onboard vehicle computer 30, a GNSS receiver 32, one or more cameras 34, a lidar sensor 36, and a vehicle communications bus 38. FIG. 1 provides an example of certain components of the vehicle electronics 18, however, it should be appreciated that, according to various embodiments, the vehicle electronics 18 may include one or more other components in addition to or in lieu of those components depicted in FIG. 1.

The global navigation satellite system (GNSS) receiver 32 receives radio signals from the constellation of GNSS satellites 24. The GNSS receiver 32 uses the received radio signals to generate location data that represents the location of the GNSS receiver 32 and, thus, the AV 16 on which it is installed. In one embodiment, such as where the test facility 12 is within the United States, the GNSS receiver 32 may be a global positioning system (GPS) receiver. In another embodiment, such as where the test facility 12 is within Europe, the GNSS receiver 32 may be a GNSS receiver configured to be used with Galileo. In addition to the location data, which may represent a location as a geographical coordinate pair, the GNSS receiver 32 may also specify the time associated with each location. This time and location data that is obtained by a GNSS receiver based on GNSS signals is referred to as GNSS data.

The one or more cameras 34 are each used to obtain image data of the vehicle's environment, and the image data, which represents an image captured by the camera(s) 34, may be represented as an array of pixels that specify color information. The camera(s) 34 may each be any suitable digital camera or image sensor, such as a complementary metal-oxide-semiconductor (CMOS) camera/sensor. The camera(s) 34 are each connected to the vehicle communications bus 38 and may provide image data to the onboard vehicle computer 30. In some embodiments, image data from one or more of the camera(s) 34 is provided to the test facility server 14. At least one of the camera(s) 34 is mounted on the AV 16 so that the field of view of the at least one camera is directed to an external environment of the vehicle, which is the environment that is proximate to and located exteriorly or externally to the AV 16. In at least some embodiments, the image data captured by the at least one camera represents an image, and the image depicts the exterior environment of the AV 16.

The images captured by the camera(s) 34 may include visual depictions of various external objects, such as one or more roads (e.g., the road on which the AV 16 is travelling), one or more pedestrians, one or more other vehicles, buildings, traffic signals, other roadside infrastructure, one or more trees or other biological/living objects, traffic signals (e.g., traffic lights), clouds, the sky, etc. One or more of the camera(s) 34 may be any of a front-facing camera that is mounted on the front of the AV 16 and facing an area in front of the AV 16, a side-facing camera that is mounted on a side of the AV 16 and facing an area to the side of the AV 16, or a rear-facing camera that is mounted on the rear or back of the AV 16 and facing an area behind the AV 16.

The lidar sensor 36 is used to obtain lidar sensor data of one or more objects within the environment, and the lidar sensor data may include range and/or position information of these object(s). The lidar sensor 36 emits non-visible light waves that reflect off of the object(s) and then the lidar sensor 36 receives the reflected light waves. It should be appreciated that various types of lidar devices may be used, including, for example, those manufactured by Velodyne™, such as, for example, the Alpha Prime™, the Ultra Puck™, Puck™, etc. The lidar sensor 36 is connected to the vehicle communications bus 38 and may provide lidar sensor data to the onboard vehicle computer 30. Although only a single lidar sensor is shown and described herein, it should be appreciated that the AV 16 may include two or more lidar sensors, according to at least some embodiments.

The onboard vehicle computer 30 is an onboard computer in that it is carried by the AV 16 and is considered a vehicle computer since it is a part of the vehicle electronics 18. The onboard vehicle computer 30 includes a processor 40 and non-transitory, computer-readable memory 42 that is accessible by the processor 40. The onboard vehicle computer 30 may be used for various processing that is carried out at the AV 16 and, in at least one embodiment, is used to carry out one or more steps of one or more of the methods described herein. The onboard vehicle computer 30 is connected to the vehicle communications bus 38 and may send messages to, and receive messages from, other vehicle components using this bus 38. The onboard vehicle computer 30 also includes a short-range wireless communications (SRWC) circuit 44 and a cellular chipset 46 that are used for wireless communications. The SRWC circuit 44 includes an antenna and is configured to carry out one or more SRWC technologies, such as any one or more of the IEEE 802.11 protocols (e.g., IEEE 802.11p, Wi-Fi™), WiMAX™, ZigBee™, Z-Wave™, Wi-Fi Direct™, Bluetooth™ (e.g., Bluetooth™ Low Energy (BLE)), and/or near field communication (NFC). In one embodiment, the SRWC circuit 44 may be used to carry out communications with the test facility server 14—for example, the AV 16 may use the SRWC circuit 44 to send messages to roadside equipment (RSE) (not shown), which may then forward the messages to the test facility server 14 via land network 20 to which the RSE is connected. The cellular chipset 46 includes an antenna and is used for carrying out cellular communications or long-range radio communications with the wireless carrier system 22. And, in one embodiment, the cellular chipset 46 includes suitable 5G hardware and 5G configuration so that 5G communications may be carried out between the AV 16 and the wireless carrier system 22, such as for purposes of carrying out communications between the AV 16 and one or more remote devices/computers, such as those implementing the test facility server 14.

In one embodiment, the AV 16 is or includes an onboard vehicle controller that is used to carry out autonomous operations and, in this sense, may be referred to as an autonomous controller. In other embodiments, the autonomous controller may be separate from the onboard vehicle computer 30, but may be communicatively coupled to the onboard vehicle computer 30 directly or via communications bus 38 or other suitable communications network. The autonomous controller may be used for making certain decisions regarding the autonomous operation of the AV 16, such as whether to make a maneuver, apply the brakes, accelerate the vehicle, etc.

The test facility server 14 is shown as including one or more processors 48 and non-transitory, computer-readable memory 50. In one embodiment, the test facility server is used to carry out one or more steps of one or more methods described herein, such as the method 200 and/or the method 300 discussed below. In such embodiments, the test facility server 14 may be configured so that, when computer instructions stored on the memory 50 are executed by the processor(s) 48, the test facility server 14 causes certain steps and/or functionality to be carried out, such as any of the functionality attributed to the test facility server 14 as discussed herein. In one embodiment, the processor(s) 48 and the memory 50 storing the computer instructions may form an autonomous vehicle testing system that is configured to carry out one or more steps of one or more methods described below. In such embodiments where the autonomous vehicle testing system is formed by component(s) remote to the AV 16, the system may be referred to as a remote-based autonomous vehicle testing system. In one embodiment, at least one of the one or more processors 48 is a graphics processing unit (GPU).

In another embodiment, one or more processors carried by the AV 16 as well as memory carried by the AV 16 form an autonomous vehicle testing system and, specifically, a vehicle-based autonomous vehicle testing system, which may be configured to carry out one or more steps of one or more methods described below. In one embodiment, at least one of the one or more processors carried by the AV 16 that forms a part of the vehicle-based autonomous vehicle testing system is a GPU. The one or more processors of the vehicle-based autonomous vehicle testing system may include the processor 40 of the onboard vehicle computer 30. However, in other embodiments, one or more other processors of the vehicle electronics 18 may be used in addition to or in lieu of the processor 40, such as those that are separate from the onboard vehicle computer 30.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the non-transitory, computer-readable memory discussed herein may be implemented as any suitable type of memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that any one or more of the computers discussed herein may include other memory, such as volatile RAM that is used by the processor, and/or multiple processors.

Figure 2:
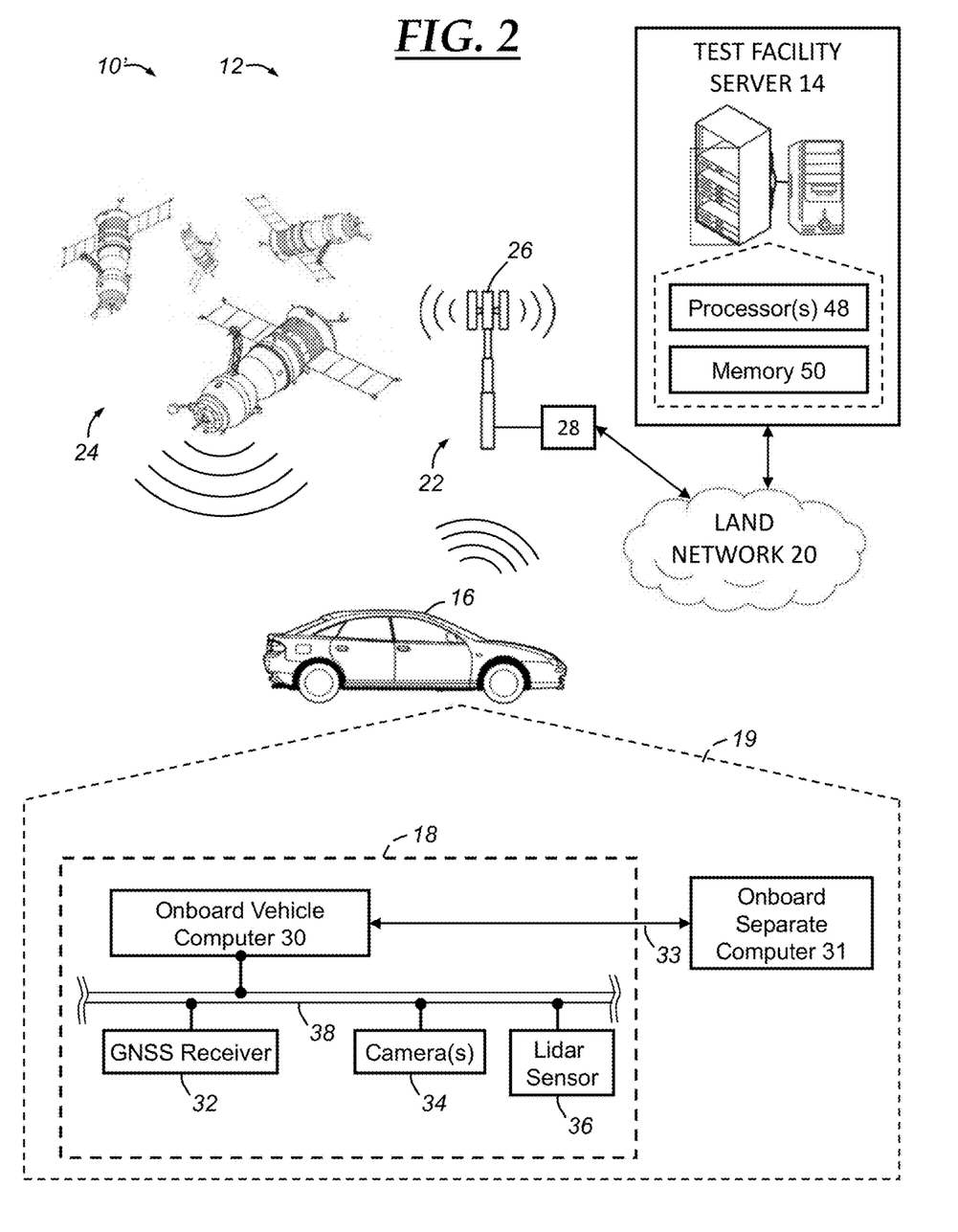
FIG. 2 depicts a communications system that includes an autonomous vehicle (AV) and a test facility server, and that may be used to carry out one or more methods described herein, according to a second embodiment.

With reference to FIG. 2, there is shown an operating environment that comprises a communications system 10' (that is used at the test facility 12), the test facility server 14, the AV 16 having the vehicle electronics 18, the land network 20, the wireless carrier system 22, the constellation of GNSS satellites 24, an onboard separate computer 31, and a wire cable 33 used to connect the onboard separate computer 31 to the vehicle electronics 18. The communications system 10' is the same as the communications system 10 (FIG. 1), except that the communications system 10' further includes the onboard separate computer 31 and the wire cable 33.

The onboard separate computer 31 is an onboard computer in that it is carried by the AV 16, but is considered "separate" since it is not provided as a part of the vehicle electronics 18 that are manufactured by the OEM. The onboard separate computer 31 may be, for example, a mobile computer (e.g., a laptop, a smartphone, a personal computer) that is configured to perform the method(s) described below, such as the method 200 and the method 300. The wire cable 33 is used to communicatively couple the onboard separate computer 31 to the vehicle electronics 18, such as to the onboard vehicle computer 30. The wire cable 33 may be, for example, a universal serial bus (USB) cable, an ethernet cable, or a cable that interfaces with an onboard diagnostics port of the vehicle electronics 18, such as an onboard diagnostics II (OBD II) port of the vehicle electronics 18. In other embodiments, the onboard separate computer 31 may be communicatively coupled to the vehicle electronics 18 via wireless communications, such as via SRWC technologies or via the wireless carrier system 22—in such embodiments, the wire cable 33 may be omitted. In at least one embodiment, the onboard separate computer 31 includes one or more processors and memory accessible by the one or more processors. The memory may include computer instructions that, when executed by the one or more processors of the onboard separate computer 31, cause the method 200 (FIG. 3) and/or the method 300 (FIG. 4) to be carried out. The one or more processors and memory of the onboard separate computer 31 may form (or may form a part of) the vehicle-based autonomous vehicle testing system. In some embodiments, a combination of the onboard separate computer 31 and one or more components of the vehicle electronics 18 (e.g., the onboard vehicle computer 30) may be used to form the vehicle-based autonomous vehicle testing system and/or to otherwise carry the method 200, the method 300, and/or out one or more steps thereof.

Figure 3:
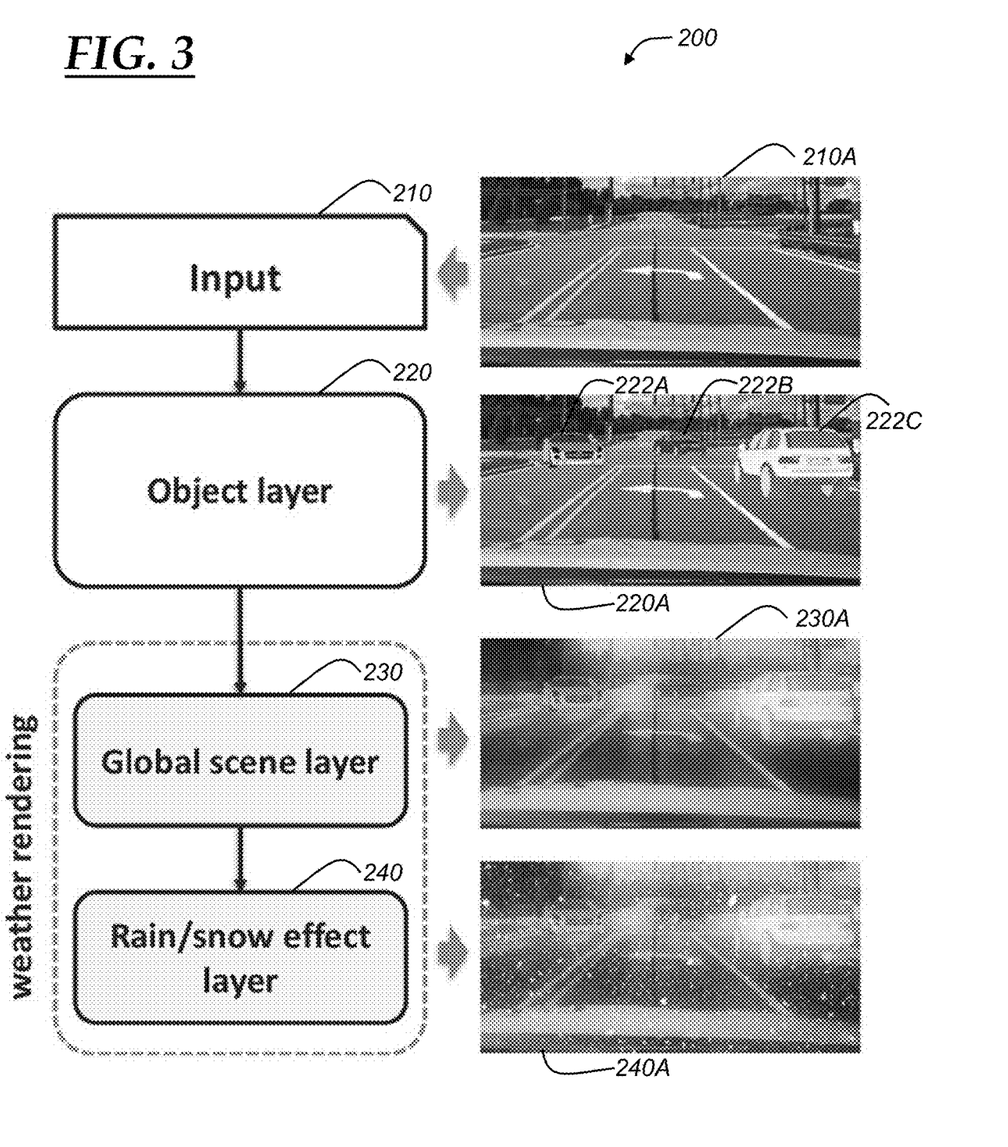
FIG. 3 is a flowchart of a method of augmenting an environmental scene for testing autonomous vehicles, according to one embodiment.

With reference to FIG. 3, there is shown an embodiment of a method 200 of augmenting an environmental scene for use by an autonomous vehicle during testing of the autonomous vehicle. According to at least some embodiments, the method 200 is used to generate a composite weather-object-augmented image, which may then be used by the AV 16 as sensor input into an autonomous vehicle process. In some such embodiments, the autonomous vehicle process is executed by the AV 16 to determine a vehicle maneuver or other autonomous vehicle operations to perform based on sensor inputs that include the composite weather-object-augmented image. In the embodiment discussed below, the vehicle's environment is a vehicle testing environment in which experiments or tests are carried out using one or more real autonomous vehicles. According to at least some embodiments, these tests or experiments include introducing composite weather-object-augmented image(s) as input into one or more operations of the vehicle as if the composite weather-object-augmented image(s) were actually captured by the camera(s) 34. In one embodiment, the method 200 is carried out by a remote-based autonomous vehicle testing system, which may include one or more components of the test facility server 14 (and/or other computers/electronics remote from the AV 16). In another embodiment, the method 200 is carried out by a vehicle-based autonomous vehicle testing system, which may include the onboard vehicle computer 30, other computers/components of the vehicle electronics 18, and/or the onboard separate computer 31.

The method 200 begins with step 210, wherein image data representing an image is captured by the AV 16. The image data is captured by a camera that is mounted on the AV 16, which may be one of the camera(s) 34. The image data represents an image taken from the perspective of a vehicle, and an example of such an image is shown in 210A. The image data may be represented as a pixel array, where each pixel of the pixel array specifies a color that may be specified using RGB or CMYK. In some embodiments, the image is a grayscale image and the pixels include grayscale pixel information. The image data is provided to and obtained by an autonomous vehicle testing system, which is a system that is used to augment the image represented by the image data so that the image includes one or more augmented graphics. In one embodiment, the autonomous vehicle testing system is implemented by one or more processors and memory that are remote from and/or not carried by the AV 16, such as those used by or locally-connected to the test facility server 14 or those used as a part of roadside equipment. In another embodiment, the autonomous vehicle testing system is implemented by one or more hardware components of the vehicle electronics 18 of the AV 16. The method 200 continues to step 220.

In step 220, virtual object graphics representing one or more virtual objects are generated and the virtual object graphics are then rendered over the image to obtain an object-augmented image. The object-augmented image refers to an image captured by a camera and that is augmented with graphics representing one or more objects. An example of an object-augmented image is shown at 220A in FIG. 3. As shown in FIG. 3, the object-augmented image 220A includes graphics representing three objects 222A, 222B, 222C, each of which is a passenger vehicle. Each of the three objects 222A, 222B, 222C are overlaid on the image 210A so as to form the object-augmented image 220A. Various different techniques may be used to generate these graphics, such as those described below with respect to the method 300 (FIG. 4). The method 200 continues to step 230.

In steps 230-240, graphics representing weather conditions are generated and rendered so as to obtain a composite weather-object-augmented image 240A. At least according to some embodiments, the weather-related graphics that are a part of the image 240A are generated in two steps: step 230 in which global scene graphics are generated based on the object-augmented image 220A, where the global scene graphics are rendered along with the virtual object graphics to form a global scene image 230A; and step 240 in which detailed weather effect graphics are generated, where the detailed weather effect graphics represent at least one detailed weather effect that corresponds to a weather condition of the global scene image and where, when the detailed weather effect graphics are combined with the global scene image 230A, a composite weather-object-augmented image 240A is generated. In the example depicted in FIG. 3, the weather conditions of the global scene image are snowy conditions.

In step 230, the global scene image is generated based on the object-augmented image 220A. As shown in FIG. 3, the global scene image 230A is the object-augmented image 220A, but with snow covering over various exterior surfaces, such as areas to the side of the roadway, parts of the road, and the vehicle hood. Additionally, the global scene image 230A includes adjustments to light-levels or colors that correspond to those observed during snowfall. Various techniques to generate and introduce these elements that are a part of the global scene graphics are discussed below. These changes introduced into the global scene image 230A are represented by global scene graphics and, in at least one embodiment, the global scene graphics form a global scene layer. The method 200 continues to step 240.

In step 240, a composite weather-object-augmented image 240A is generated by combining the global scene image 230A and the detailed weather effect graphics that represent at least one detailed weather effect. In at least some embodiments, the at least one detailed weather effect corresponds to the weather conditions of the global scene graphics. As shown in FIG. 3, one of the at least one detailed weather effect is snowfall in which snowflakes are introduced over the global scene image 230A so that it appears to presently be snowing. Additionally, a second one of the at least one detailed weather effect is snow buildup or accumulation that is provided on a portion of the image corresponding to the windshield. Here, both of the detailed weather effects correspond to the weather conditions used to generate the global scene image, which are snowy conditions. However, in other embodiments, one or more detailed weather effects may be generated that do not correspond to the weather effect used to generate the global scene image. In this example, the addition of the generated detailed weather effect graphics to the global scene image 230A results in generation of the composite weather-object-augmented image 240A. The method 200 then ends.

Figure 4:
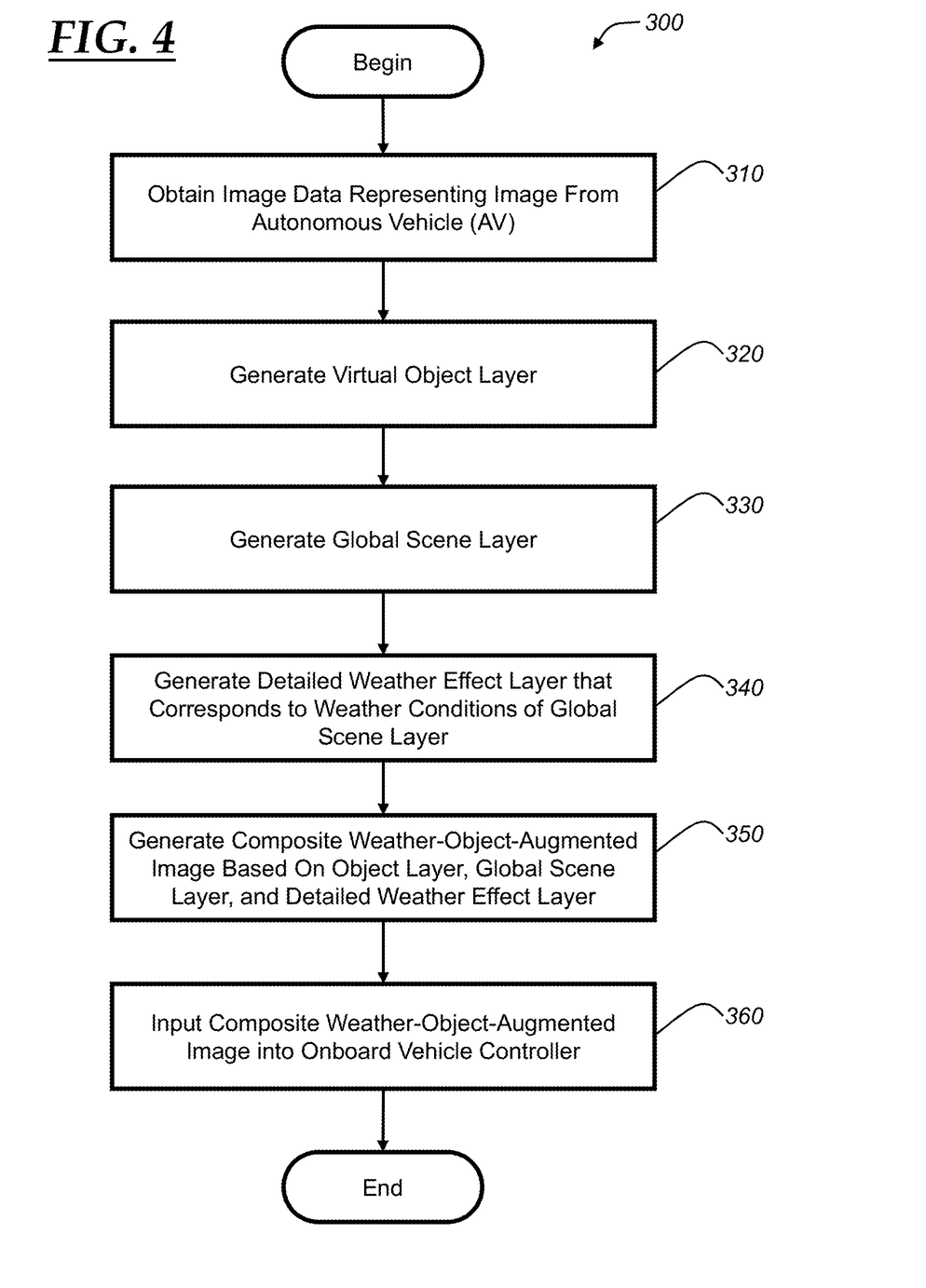
FIG. 4 is a flowchart of a method of augmenting an environmental scene for use by an autonomous vehicle during testing of the autonomous vehicle, according to one embodiment.

With reference to FIG. 4, there is shown an embodiment of a method 300 of augmenting an environmental scene for use by an autonomous vehicle during testing of the autonomous vehicle. The discussion of the method 300 below provides additional details concerning certain steps, and it should be appreciated that the discussion of the method 200 above applies here to the method 300 to the extent that the discussion above is not inconsistent with the discussion of the method 300 below. Although the steps 310-360 are described as being carried out in a particular order, it should be appreciated that the steps 310-360 may be carried out in any technically feasible order. For example, in one embodiment, step 340 may be carried out prior to or in conjunction with step 330—in such an example, detailed weather effect graphics may be generated in step 340 and, thereafter or concurrently, global scene graphics may be generated in step 330. These graphics may be combined with one another and the virtual object graphics (step 320) to generate the composite weather-object-augmented image (step 350).

The method 300 begins with step 310, wherein image data representing an image is obtained from an autonomous vehicle. The image data may be sent from the camera(s) 34 to the autonomous vehicle testing system, and this may be carried out by sending the image data from the camera(s) 34 that captured the image to the onboard vehicle computer 30 via the communications bus 38 and/or to the test facility server 14 via the wireless carrier system 22 and land network 20, for example. In another embodiment, this may be carried out by sending the image data from the onboard vehicle computer 30 to the onboard separate computer 31 via the wire cable 33. This step is analogous to step 210 of the method 200 and that discussion is incorporated here. The method 300 continues to step 320.

In at least some embodiments, the method further includes a step of obtaining camera pose information that represents a pose of the camera during a time at which the image was captured by the camera. In at least some embodiments, the pose information specifies an orientation of the camera and a position of the camera relative to the AV 16 or relative to earth (i.e., a global position, which may be based on GNSS data). The pose of the camera that captured the image may be represented in various ways. For example, when the camera's orientation and position is fixed relative to the AV 16, then the position and orientation of the AV 16 may be used along with information specifying the position/orientation relationship or offset between the position/orientation device (e.g., the GNSS receiver 32) of the AV 16 and the camera. This camera position/orientation offset information may be predetermined based on specifications of the vehicle and/or through an empirical or measurement process. This predetermined camera position/orientation offset information may be stored at the AV 16 or the test facility server 14. In another embodiment, such as where the camera's field of view is moveable relative to the AV 16, the camera pose information may be represented or based on a combination of GNSS information (or other vehicle position/orientation information) and camera position/orientation information, which may be obtained by an accelerometer or other inertial sensor integrated into the camera. Such embodiments may also employ certain predetermined camera position/orientation offset information. This step of obtaining camera pose information may be carried out after step 310 and before step 320, at least according to some embodiments.

In at least some embodiments, the method further includes a step of obtaining vehicle pose information that represents the position and orientation of the vehicle. The vehicle pose information may be obtained based on GNSS data from the GNSS receiver 32 and/or inertial sensor information that may be obtained by, for example, one or more accelerometers mounted on the AV 16 and that are a part of the vehicle electronics 18. The vehicle pose information may be provided to the test facility server 14 via wireless carrier system 22 and/or land network 20. In embodiments where the method 300 is carried out by a vehicle-based autonomous vehicle testing system (e.g., comprising the onboard vehicle computer 30, other portions of the vehicle electronics 18, and/or the onboard separate computer 31), the vehicle pose information and/or the camera pose information may be provided to the vehicle-based autonomous vehicle testing system, such as from the vehicle electronics 18 to the onboard separate computer 31 by wired communication using the wire cable 33.

In at least one embodiment, step 310, the step of obtaining camera pose information, and/or the step of obtaining vehicle pose information includes sending the image data, camera pose information, and/or vehicle pose information from the AV 16 to the test facility server 14 using 5G wireless communications, which may be carried out by the cellular chipset 46 and the wireless carrier system 22. Through use of 5G communications, the image data, camera pose information, and/or vehicle pose information can be communicated to the test facility server 14 with minimal or relatively low latency. Moreover, in such embodiments, use of computers possessing large computation capacity, which are oftentimes more readily available at a remote server than on the vehicle, enables low latency traffic/environment simulations and image augmentation, at least according to some embodiments.

Figure 5:
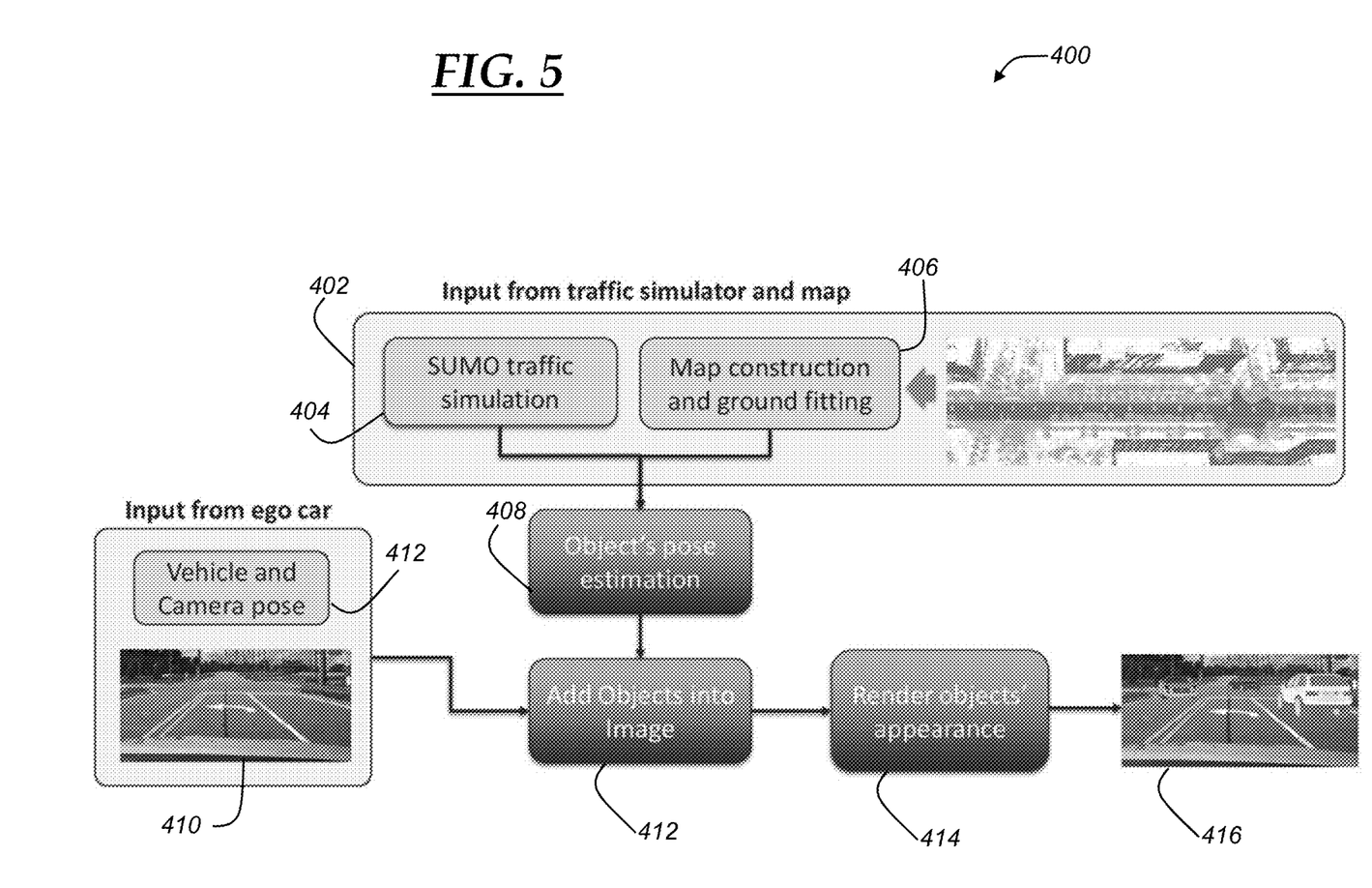
FIG. 5 is a flowchart of a process for generating and rendering virtual object graphics that may be used as a part of the methods of FIGS. 3-4, according to one embodiment.

In step 320, virtual object graphics representing one or more virtual objects are generated. The virtual object graphics, when rendered over (or otherwise combined with) the image, result in an object-augmented image. This step is similar to step 220 of the method 200 and that discussion is incorporated here. The presence, position, and orientation of the virtual object(s) to be rendered may be determined based on a traffic simulation that is executed by the autonomous vehicle testing system. The traffic simulation is used to simulate virtual road objects and/or users, including cars, bicycles, other vehicles, pedestrians, traffic signals, and/or other traffic-related virtual objects. In at least one embodiment, the traffic simulation is at least partially based on one or more artificial intelligence (AI) techniques. An example of an AI-driven object rendering pipeline or process flow is shown in FIG. 5. A traffic simulator 402 that generates and executes the traffic simulation is shown as including an Eclipse Simulation of Urban MObility (SUMO™) module 404 that is used for modelling intermodal traffic systems, including road vehicles, public transportation, and pedestrians. The traffic simulator 402 also includes a map construction and ground fitting module 406 that is used for fitting virtual objects created by the SUMO module 404 to an appropriate location within the test facility 12. At least in some embodiments, the map construction and ground fitting module 406 is used to generate a three-dimensional map that may be constructed or built using lidar SLAM technique (or LeGO-LOAM), which generates dense point clouds of the environment. Given these point clouds, the ground plane is fitted through ground point extraction techniques (or a Cloth Simulation-based Filtering algorithm), at least according to some embodiments. Through use of the SUMO module 404 and the map construction and ground fitting module 406, a pose of the object(s) to be rendered is estimated as shown at 408. In at least one embodiment, the SUMO module 404 provides the location and the yaw angle of the object and the map construction and ground fitting module 406 is used to provide pitch and roll angle information that specifies the pitch and roll angles of the virtual object. However, in other embodiments, the SUMO module 404 may provide pitch and roll angle information.

The image data 410 and the camera and vehicle pose information 412 are received from the AV 16 and used along with the object pose estimation information 408 to determine a suitable appearance of the virtual object when rendered over the image, which occurs at 414. Once the virtual object graphics are rendered over the image, an object-augmented image 416 is then obtained. Known techniques may be used for determining the virtual object's appearance and, once this is determined, virtual object graphics representing the virtual object are rendered over the image. Rendering of the virtual object may be carried out using known techniques. In one embodiment, the rendering of the object's appearance is performed through use of two deep-learning-based algorithms, namely, for example, Visual Object Networks (VON) and HoloGAN. In such an embodiment, the inputs of the neural rendering include latent codes, which control the virtual object's shape and appearance, and camera/object pose information. The object-augmented image may be further processed using alpha blending of the raw or initial image (as represented by the image data) and the graphics representing the virtual objects may then be rendered on top of this processed background image. According to at least some embodiments, through use of such techniques, the virtual objects appear photorealistic—that is, as if they were real objects that were a part of the original image captured by the camera. Once the graphics representing the one or more objects are rendered, the method 300 continues to step 330.

In step 330, global scene graphics are generated and, in at least some embodiments, the global scene graphics are generated based on the object-augmented image. The global scene graphics, when rendered over the image and/or along with the object-augmented image, results in a visual representation of the environment as the environment would appear when experiencing predetermined or selected weather conditions. In at least some embodiments, the predetermined weather conditions may be selected by a user, such as a test facility operator or other personnel, or may be selected by a simulator or other automated computer process. The weather conditions may be selected according to a test configuration or scenario, at least in one embodiment. Also, in at least some embodiments, the preselected weather conditions are or at least may be different than current weather conditions of the environment in which the AV 16 is being tested.

Figure 6:
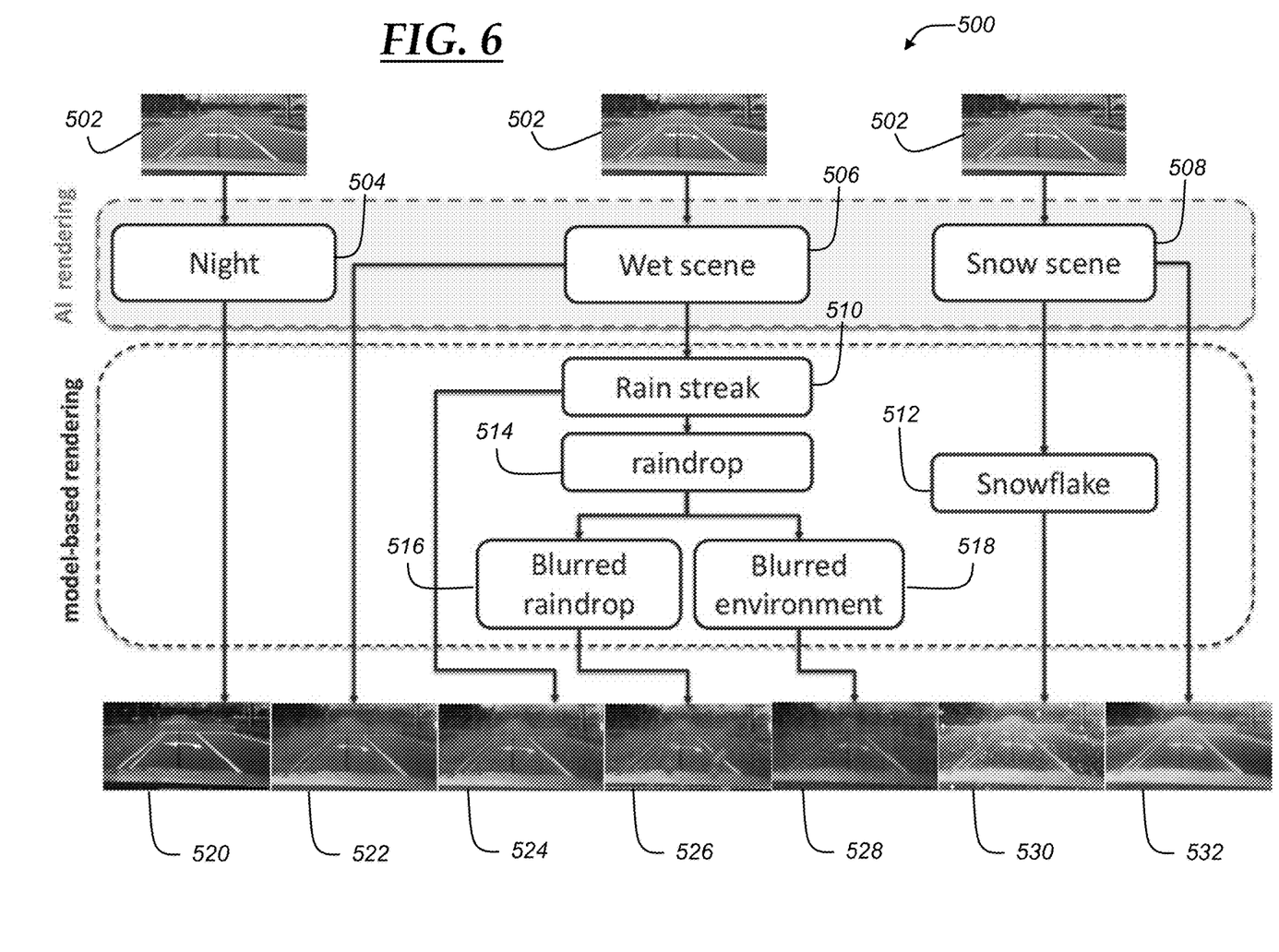
FIG. 6 is a flowchart of a process for generating weather-related graphics that maybe used as a part of the methods of FIGS. 3-4, according to one embodiment.

In at least one embodiment, the global scene graphics are generated by using an artificial intelligence (AI) technique. Through use of the AI technique, changes to global aspects of the image may be achieved, such as changes to lighting levels, introduction of moisture or precipitation on the road (e.g., wet road appearance, snow covering the road), etc. In one embodiment, the AI technique is a Multimodal Unsupervised Image-to-Image Translation (MUNIT) technique that employs MUNIT algorithm(s) and that is used to render the global scene graphics. At least in some embodiments, the MUNIT implementation assumes that the latent space of images is decomposed into a content space and a style space. Images in different domains share a common content space that reflects the underlying spatial structure, but own unique style spaces that contains scene changes, such as weather conditions. MUNIT is trained in an unsupervised manner, requiring unpaired images in different weather conditions only. According to some embodiments, three models (day-to-night, sunny-to-wet, and sunny-to-snow) are trained on data collected, which may include data collected from the test facility or environment. As shown in FIG. 6, the input image 502 was taken on a sunny day and, through use of a first AI model (as shown at 504), the image was modified so that it appears as if it is nighttime with lower light levels (see image 520). Also, as shown in FIG. 6, through use of a second AI model, the image was modified so that it appears as if the road is wet as shown at 506 (see image 522). Additionally, as shown in FIG. 6, through use of a third AI model, the image was modified so that it appears as if the road appears to be covered with snow as shown at 508 (see image 532). Although certain exemplary weather and lighting conditions are described herein, it should be appreciated that other weather and lighting conditions may be used, such as foggy weather or nighttime lighting. Also, in some embodiments, in addition to or in lieu of rendering weather-related graphics as a part of the global scene graphics, lighting graphics or effects may be generated and/or rendered as a part of the global scene image. Thus, in some embodiments, the global scene graphics include graphics that introduce predetermined lighting effects into the composite weather-object-augmented image. The method 300 continues to step 340.

In step 340, detailed weather effect graphics are generated. The detailed weather effect graphics represent at least one detailed weather effect and, in at least some embodiments, the at least one detailed weather effect corresponds to the predetermined weather conditions of the global scene image. Also, in at least some embodiments, the detailed weather effect graphics are generated using a physics-based technique. As shown in FIG. 6, physics-based models or techniques are used to generate detailed weather effect graphics representing or at least relating to a rain streak 510 and a snowflake 512. In particular, the detailed weather effects relating to the rain streak 510 includes introducing raindrops 514 and may further include blurring the rain drop/streak effect 516 and/or blurring the environment 518. In some embodiments, AI-based techniques may be used instead of or in addition to the physics-based technique(s) so as to generate the detailed weather effect graphics. Various examples of such detailed weather effects are shown at 524, 526, 528, and 530.

In one embodiment, the rain streak rendering may be carried out using a particle system (e.g., API from Unity™) that is used to simulate the spatial-temporal distribution and trajectory of raindrops in three-dimensional space. The rain streak texture is rendered by or based on a streak database, and the rain streak appearance is generated based on certain camera/image parameters, such as lighting source and raindrop size. The final rendered image, which is shown at 524, is the global scene image with the rendered rain streak layer on top.

In one embodiment, the raindrop rendering may be carried out according to one of two scenarios: a first scenario in which the camera is focused on the environment and a second scenario in which the camera is focused on the raindrops. In the first scenario, the raindrops are blurred and this may be carried out by using a sphere raindrop model to generate the raindrop and then modifying its appearance through use of a fisheye effect to simulate blurring. An example of this is shown at 526. In the second scenario, clear raindrop images taken from the real world are obtained and randomly selected to blend with the out-of-focus blurred version of the image using alpha blending, and an example of this is shown at 528.

In one embodiment, the snowflake rendering is carried out using photorealistic snowflake images or graphics from the Snow100k² dataset. According to one embodiment, masked snowflake images are extracted from real images contained in the Snow100k² dataset and each image is assigned a set of parameters (e.g., size, speed), which may be according to the density of the snowflakes to be simulated. For a real image J from the vehicle, one snowflake layer S that satisfies the rendering request is selected and then cropped/resized to fit the input frame. The final rendered result I is synthesized using the snowflake image model: I=zS+J(1−z), where z is the binary mask of S. An example of this result is shown at 530. The method 300 continues to step 350.

In step 350, a composite weather-object-augmented image is generated based on the virtual object graphics, the global scene graphics, and the detailed weather effect graphics. In one embodiment, an object-augmented image is first generated by rendering the virtual object graphics over (or otherwise combining the virtual object graphics with) the image obtained from the camera, such as that which is shown at 220A (FIG. 3). Then, the global scene graphics are added to or combined with the object-augmented image (or virtual object graphics) to generate a global scene image, such as the global scene image 230A (FIG. 3). Thereafter, the detailed weather effect graphics are added or combined with the global scene image to generate the composite weather-object-augmented image, such as that which is shown at 240A (FIG. 3). In one embodiment, the detailed weather effect graphics are generated so as to form a detailed weather effect layer, which is then rendered over the global scene image thereby resulting in the composite weather-object-augmented image. In other embodiments, the global scene graphics and the detailed weather effect graphics may first be combined with one another to form a weather layer and then the weather layer may be combined with the object-augmented image to generate the composite weather-object-augmented image. Of course, according to other embodiments, the composite weather-object-augmented image may be generated using a different sequence of steps. And, in one embodiment, the composite weather-object-augmented image includes only global scene graphics or detailed weather effect graphics, but not both. And, in another embodiment, instead of generating a composite weather-object-augmented image, a weather-augmented image having global scene graphics and/or detailed weather effect graphics is generated. This weather-augmented image may not include any virtual objects and, when this is the case, step 320 may be omitted. The method 300 continues to step 360.

In step 360, the composite weather-object-augmented image (or other augmented image) is inputted into an onboard vehicle controller of the autonomous vehicle. In at least some embodiments, the composite weather-object-augmented image is inputted into the onboard vehicle controller so that the AV carries out at least one autonomous operation based on the composite weather-object-augmented image. And, in at least one embodiment, the composite weather-object-augmented image is inputted into the onboard vehicle controller in a manner such that the onboard vehicle controller behaves as though the composite weather-object-augmented image is a non-augmented image. In cases where the composite weather-object-augmented image is generated at a remote-based autonomous vehicle testing system, the composite weather-object-augmented image may be sent from the remote system (e.g., the test facility server 14) to the AV 16 via 5G communications, which may be carried out by the wireless carrier system 22 and the cellular chipset 46. Of course, in other embodiments, other communication paths may be used, such as transmitting the composite weather-object-augmented image to the AV 16 via the land network 20, roadside equipment, and the SRWC circuit 44.

As mentioned above, the composite weather-object-augmented image may be inputted into the onboard vehicle controller in a manner such that the onboard vehicle controller behaves as though the composite weather-object-augmented image is a non-augmented image. The non-augmented image refers to an image that is captured by the camera and not modified to include any virtual graphics or weather/environment changes, such as the introduction of snow or changes in light levels. The AV 16 may be configured so that the composite weather-object-augmented image is able to be passed into the onboard vehicle controller (e.g., the onboard vehicle computer 30) in a manner such that the onboard vehicle controller behaves as though the composite weather-object-augmented image is an image only having real elements. This results in the ability to introduce a variety of testing scenarios regardless of the actual weather of the test facility 12.

Further, in some embodiments, additional changes to the vehicle electronics 18 may be made so that the AV 16 acts as though the virtual objects are actually present and/or so that the predetermined weather conditions are actually present at the test facility 12. For example, when virtual vehicle 222A is introduced into the composite weather-object-augmented image 240A, the vehicle electronics 18 may modify lidar signals so that the lidar signals indicate that the virtual vehicle 222A is actually present in accordance with the composite weather-object-augmented image 240A. Additionally, in one embodiment, the modified or virtual lidar signals may be received from the test facility server 14 and then inputted into the onboard vehicle controller in a manner such that the onboard vehicle controller behaves as though the modified lidar signals are actually received from the lidar sensor 36 (and not modified). The method 300 then ends. In at least some embodiments, the method 300 is continuously carried out so that a succession of composite weather-object-augmented images are generated and inputted into the onboard vehicle controller.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of augmenting an environmental scene for use by an autonomous vehicle during testing of the autonomous vehicle, comprising the steps of:
    obtaining, from an autonomous vehicle, image data representing an image, wherein the image is captured by a camera mounted on the autonomous vehicle and depicts an environment in which the autonomous vehicle resides;
    generating virtual object graphics representing one or more virtual objects that, when rendered over the image, result in an object-augmented image;
    generating global scene graphics based on the object-augmented image that, when rendered along with the object-augmented image, result in a visual representation of the environment as the environment would appear when experiencing predetermined weather conditions, and wherein the global scene graphics are generated by using one or more artificial intelligence (AI) techniques;
    generating detailed weather effect graphics representing at least one detailed weather effect, wherein the detailed weather effect graphics are generated using one or more physics-based techniques;
    generating a composite weather-object-augmented image based on the virtual object graphics, the global scene graphics, and the detailed weather effect graphics; and
    causing the composite weather-object-augmented image to be inputted into an onboard vehicle controller of the autonomous vehicle so that the autonomous vehicle carries out at least one autonomous operation based on the composite weather-object-augmented image.

2. The method of claim 1, wherein the method further comprises the step of obtaining camera pose information that represents a pose of the camera during a time at which the image was captured by the camera, and wherein a pose of the one or more objects are determined based on the camera pose information so that the one or more objects, when rendered over the image, appear photorealistic.

3. The method of claim 2, wherein the method further comprises the step of obtaining vehicle pose information that represents a pose of the autonomous vehicle during the time at which the image was captured by the camera.

4. The method of claim 3, wherein the camera pose information and/or the vehicle pose information is used to generate the virtual object graphics.

5. The method of claim 4, wherein the virtual object graphics are generated based on at least one AI technique.

6. The method of claim 1, wherein the method is carried out by an onboard separate computer, and wherein the onboard separate computer is communicatively connected to vehicle electronics of the autonomous vehicle.

7. The method of claim 1, wherein the steps of the method are each carried out more than once so as to generate a plurality of composite weather-object-augmented images and input the plurality of composite weather-object-augmented images into the onboard vehicle controller.

8. The method of claim 1, wherein the image data is captured at the autonomous vehicle and then transmitted from the autonomous vehicle to a test facility server, and wherein the transmission of the image data includes the use of 5G cellular communications.

9. The method of claim 8, wherein the test facility server is configured to carry out the generating virtual object graphics step, the generating global scene graphics step, the generating detailed weather effect graphics step, the generating the composite weather-object-augmented image step, and the causing step.

10. The method of claim 9, wherein the causing step includes transmitting the composite weather-object-augmented image to the autonomous vehicle using 5G cellular communications.

11. The method of claim 1, the at least one detailed weather effect corresponds to the predetermined weather conditions.

12. The method of claim 1, wherein the composite weather-object-augmented image is inputted into the onboard vehicle controller in a manner such that the onboard vehicle controller behaves as though the composite weather-object-augmented image is a non-augmented image.

13. The method of claim 1, wherein the predetermined weather conditions are different than current weather conditions of the environment so that the global scene graphics, when rendered along with the object-augmented image, result in a visual representation of the environment as the environment would appear when experiencing weather that is different than current weather of the environment.

14. An autonomous vehicle testing system, comprising one or more electronic processors and non-transitory, computer-readable memory that is accessible by the one or more electronic processors and that stores computer instructions;
    wherein, when the computer instructions are executed by the one or more electronic processors, the autonomous vehicle testing system:
        obtains, from an autonomous vehicle, image data representing an image, wherein the image is captured by a camera mounted on the autonomous vehicle and depicts an environment in which the autonomous vehicle resides;
        generates virtual object graphics representing one or more virtual objects that, when rendered over the image, result in an object-augmented image;
        generates global scene graphics based on the object-augmented image that, when rendered along with the object-augmented image, result in a visual representation of the environment as the environment would appear when experiencing predetermined weather conditions, and wherein the global scene graphics are generated by using one or more artificial intelligence (AI) techniques;
        generates detailed weather effect graphics representing at least one detailed weather effect, wherein the detailed weather effect graphics are generated using one or more physics-based techniques;
        generates a composite weather-object-augmented image based on the virtual object graphics, the global scene graphics, and the detailed weather effect graphics; and
        cause the composite weather-object-augmented image to be inputted into an onboard vehicle controller of the autonomous vehicle so that the autonomous vehicle carries out at least one autonomous operation based on the composite weather-object-augmented image.

15. The autonomous vehicle testing system of claim 14, wherein at least one electronic processor of the one or more electronics processors is a graphics processing unit (GPU).

16. The autonomous vehicle testing system of claim 14, wherein the one or more electronic processors are located remotely from the autonomous vehicle and wherein the autonomous vehicle is configured to use 5G cellular communications to send the image data to the test facility server and to receive the composite weather-object-augmented image from the test facility server.

17. The autonomous vehicle testing system of claim 14, wherein the autonomous vehicle testing system is further configured so that, when the computer instructions are executed by the one or more electronic processors, the autonomous vehicle testing system further obtains camera pose information that represents a pose of the camera during a time at which the image was captured by the camera, and wherein a pose of the one or more objects are determined based on the camera pose information so that the one or more objects, when rendered over the image, appear photorealistic.

18. The autonomous vehicle testing system of claim 14, wherein the autonomous vehicle testing system is further configured so that, when the computer instructions are executed by the one or more electronic processors, the autonomous vehicle testing system further obtains vehicle pose information that represents a pose of the autonomous vehicle during the time at which the image was captured by the camera.

19. The autonomous vehicle testing system of claim 18, wherein the camera pose information and/or the vehicle pose information is used to generate the virtual object graphics.

20. The autonomous vehicle testing system of claim 19, wherein the global scene graphics include graphics that introduce predetermined lighting effects into the composite weather-object-augmented image.

* * * * *